United States Patent
Ngo et al.

(10) Patent No.: US 11,436,189 B2
(45) Date of Patent: Sep. 6, 2022

(54) PERFORMANCE- AND COST-EFFICIENT ARCHIVING OF SMALL OBJECTS

(71) Applicant: International Business Machines Corporation, Armonk, NY (US)

(72) Inventors: Khanh V. Ngo, Tucson, AZ (US); Slavisa Sarafijanovic, Adliswil (CH); Dominic Mueller-Wicke, Weilburg (DE); Simon Lorenz, Biebertal (DE); Harald Seipp, Mainz (DE); Takeshi Ishimoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/279,916

(22) Filed: Feb. 19, 2019

(65) Prior Publication Data

US 2020/0265006 A1    Aug. 20, 2020

(51) Int. Cl.
*G06F 16/11* (2019.01)
*G06F 16/185* (2019.01)
*G06F 3/06* (2006.01)

(52) U.S. Cl.
CPC ............ *G06F 16/113* (2019.01); *G06F 3/061* (2013.01); *G06F 3/0649* (2013.01); *G06F 3/0685* (2013.01); *G06F 16/185* (2019.01)

(58) Field of Classification Search
CPC ...... G06F 16/113; G06F 16/185; G06F 3/061; G06F 3/0649; G06F 3/0685
USPC ....................................................... 707/667
See application file for complete search history.

(56) References Cited

U.S. PATENT DOCUMENTS

| 6,098,074 A | 8/2000 | Cannon et al. |
| 7,843,907 B1* | 11/2010 | Abou-Emara ...... H04L 49/3045 370/386 |
| 2004/0133577 A1* | 7/2004 | Miloushev ............ H04W 4/027 |
| 2013/0166724 A1* | 6/2013 | Bairavasundaram ........ G06F 9/5016 709/224 |
| 2015/0205819 A1* | 7/2015 | Brand ................... G06F 16/182 707/694 |

(Continued)

OTHER PUBLICATIONS

Bazar, Sandeep, et al. "A Deployment Guide for IBM Spectrum Scale Unified File and Object Storage," IBM Redpaper, Feb. 2017.

(Continued)

*Primary Examiner* — Hosain T Alam
*Assistant Examiner* — Nicholas E Allen
(74) *Attorney, Agent, or Firm* — Nelson IP; Daniel P. Nelson (57) ABSTRACT

A method includes receiving a plurality of files where each file represents an object. The method further combines selected files of the plurality of files into an aggregation file and stores the aggregation file on low-latency storage media, such as disk storage media. The method represents the aggregation file with a single inode that is stored on the low-latency storage media. The method migrates the aggregate file to high-latency storage media, such as tape storage media. By collecting files into larger aggregation files, the number of files archived is significantly reduced and the files archived are of larger size. The reduced number of files and increased size of the files improves archival and retrieval performance due to reduced metadata operation overhead. A corresponding system and computer program product are also disclosed.

14 Claims, 7 Drawing Sheets

(56) References Cited

U.S. PATENT DOCUMENTS

| | | | |
|---|---|---|---|
| 2015/0227435 A1* | 8/2015 | Ashutosh | G06F 11/1451 |
| | | | 711/162 |
| 2015/0227465 A1 | 8/2015 | Sundaram et al. | |
| 2015/0302149 A1* | 10/2015 | Whitsitt | G16H 10/60 |
| | | | 705/3 |
| 2015/0332010 A1* | 11/2015 | Olson | G06F 19/322 |
| | | | 705/3 |
| 2016/0042005 A1* | 2/2016 | Liu | G06F 9/455 |
| | | | 711/103 |
| 2016/0139843 A1* | 5/2016 | Shah | G06F 16/27 |
| | | | 711/162 |
| 2016/0224578 A1 | 8/2016 | Wideman et al. | |
| 2017/0010826 A1 | 1/2017 | Basham et al. | |
| 2017/0052706 A1* | 2/2017 | Sarafijanovic | G06F 3/0644 |
| 2017/0090776 A1* | 3/2017 | Kowles | G06F 3/0655 |
| 2017/0242587 A1* | 8/2017 | Blaum | G06F 3/067 |
| 2017/0374147 A1* | 12/2017 | McNair | H04L 41/0896 |
| 2018/0189309 A1* | 7/2018 | Bhagwat | G06F 3/0647 |
| 2018/0203866 A1* | 7/2018 | Surcouf | G06F 16/164 |
| 2018/0316577 A1* | 11/2018 | Freeman | H04L 41/5009 |
| 2018/0341665 A1* | 11/2018 | Basham | G06F 16/211 |
| 2018/0373745 A1* | 12/2018 | Bhagwat | G06F 16/955 |
| 2019/0034453 A1* | 1/2019 | Jarvis | G06F 16/13 |
| 2019/0042595 A1* | 2/2019 | Basham | G06F 16/162 |

OTHER PUBLICATIONS

"Swift High Latency Media," Published May 18, 2018, available at https://developer.ibm.com/open/projects/swift-high-latency-media/.

Coyne, Larry, et al., "IBM Spectrum Archive Enterprise Edition V1.2.6 Installation and Configuration Guide," IBM Redbooks, Jun. 2018.

Ngo, Khanh, et al., "Implementing OpenStack SwiftHLM with IBM Spectrum Archive EE or IBM Spectrum Protect for Space Management," IBM Redpaper, 2017.

Lecuyer, Alexandre, "Optimizing storage for small objects in Swift," Jun. 2018, available at http://lists.openstack.org/pipermail/openstack-dev/2017-June/118494.html.

Poznyakoff, Sergey "Extended File Attributes," Dec. 2017, available at https://www.gnu.org/software/tar/manual/html_node/Extended-File-Attributes.html.

"How do I extract a specific file from a tar archive?," Jul. 2012, available at https://askubuntu.com/questions/168795/how-do-i-extract-a-specific-file-from-a-tar-archive.

* cited by examiner

PERFORMANCE- AND COST-EFFICIENT ARCHIVING OF SMALL OBJECTS

BACKGROUND

Field of the Invention

This invention relates to systems and methods for archiving small objects in a performance- and cost-efficient manner.

Background of the Invention

Object storage (also known as object-based storage) is a data storage architecture that manages data as objects, as opposed to other storage architectures like file systems which manage data as a file hierarchy, or block storage which manages data as blocks within sectors and tracks. Advantages of object storage include high scalability, availability, robustness, and performance, due to its distributed design for parallel, stateless processing. In certain implementations of object storage, each object may be identified using an Internet-wide unique URL (Uniform Resource Locator) organized hierarchically in the form of:

hostname_or_ip/account/container/object

For storing or accessing an object, any of multiple proxy nodes of a storage system can map the object URL to the object data storage location (i.e., the storage node, the device, and the path on the device) using a hash-based mathematical function, without the need to keep or retrieve any per-object information other than the object URL. A list of containers for each account (e.g., user) is typically stored in a per-account database, a list of objects for each container is typically stored in a per-container database, and the databases may be addressed using the hash-based approach discussed above. This enables efficient, distributed, and parallel processing to list object storage content and store or retrieve object data from the storage nodes.

The object data files and the account and container databases across the storage nodes are typically stored, at least initially, to low latency media (LLM) storage, such as disk drives. In object storage use cases with large amounts of data and a large proportion of data that is accessed infrequently, the infrequently accessed data may be migrated to cheaper high latency media (HLM) storage such as tape or optical disk based file storage.

Standard object storage solutions may migrate data of each LLM file to an HLM file, and replace each LLM file with a zero-size file added attribute (also referred to as an "inode") that points to the HLM file location (such as the tape name and file name on the tape). Before the migrated objects are accessed by a user or application, they typically must first be recalled from the high latency media (HLM) to the low latency media (LLM) in order to avoid data access latencies, timeouts, and inefficient use of LLM resources.

Unfortunately, one drawback of standard HLM-based object storage is that, for small files, the performance for migrating and recalling the small files between LLM and HLM is very low. Performance degradation for small files in file systems is well known and understood. This drawback directly impacts the performance of object storage solutions built on top of file storage. Other storage solutions also exhibit inefficiencies when storing and accessing many small units of data, due to per-data unit processing and metadata overhead. Use of solid state drives (SSD) instead of hard disk drives (HDD) as LLM storage may improve small object performance to a certain extent, but if migration to HLM is used, the zero-size file inodes still occupy expensive SSD space and migration and recall are still slow due to the poor small-file performance on the HLM file system. If a linear tape file system (LTFS) is used with the LLM storage media, large numbers of small files also create significant metadata storage overhead on the tape.

In view of the foregoing, what are needed are systems and methods to archive many small objects in a performance- and cost-efficient manner. Ideally, such systems and methods will improve performance in storage systems where small objects are migrated and recalled between low latency and high latency storage media.

SUMMARY

The invention has been developed in response to the present state of the art and, in particular, in response to the problems and needs in the art that have not yet been fully solved by currently available systems and methods. Accordingly, systems and methods have been developed to archive many small objects in a performance- and cost-efficient manner. The features and advantages of the invention will become more fully apparent from the following description and appended claims, or may be learned by practice of the invention as set forth hereinafter.

Consistent with the foregoing, a method for archiving small objects in a performance- and cost-efficient manner is disclosed. In one embodiment, such a method includes receiving a plurality of files where each file represents an object. The method further combines selected files of the plurality of files into an aggregation file and stores the aggregation file on low-latency storage media, such as disk storage media. The method represents the aggregation file with a single inode that is stored on the low-latency storage media. The method migrates the aggregate file to high-latency storage media, such as tape storage media. By collecting files into larger aggregation files, the number of files archived is significantly reduced and the files archived are of larger size. The reduced number of files and increased size of the files improves archival and retrieval performance due to reduced metadata operation overhead.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program remove.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
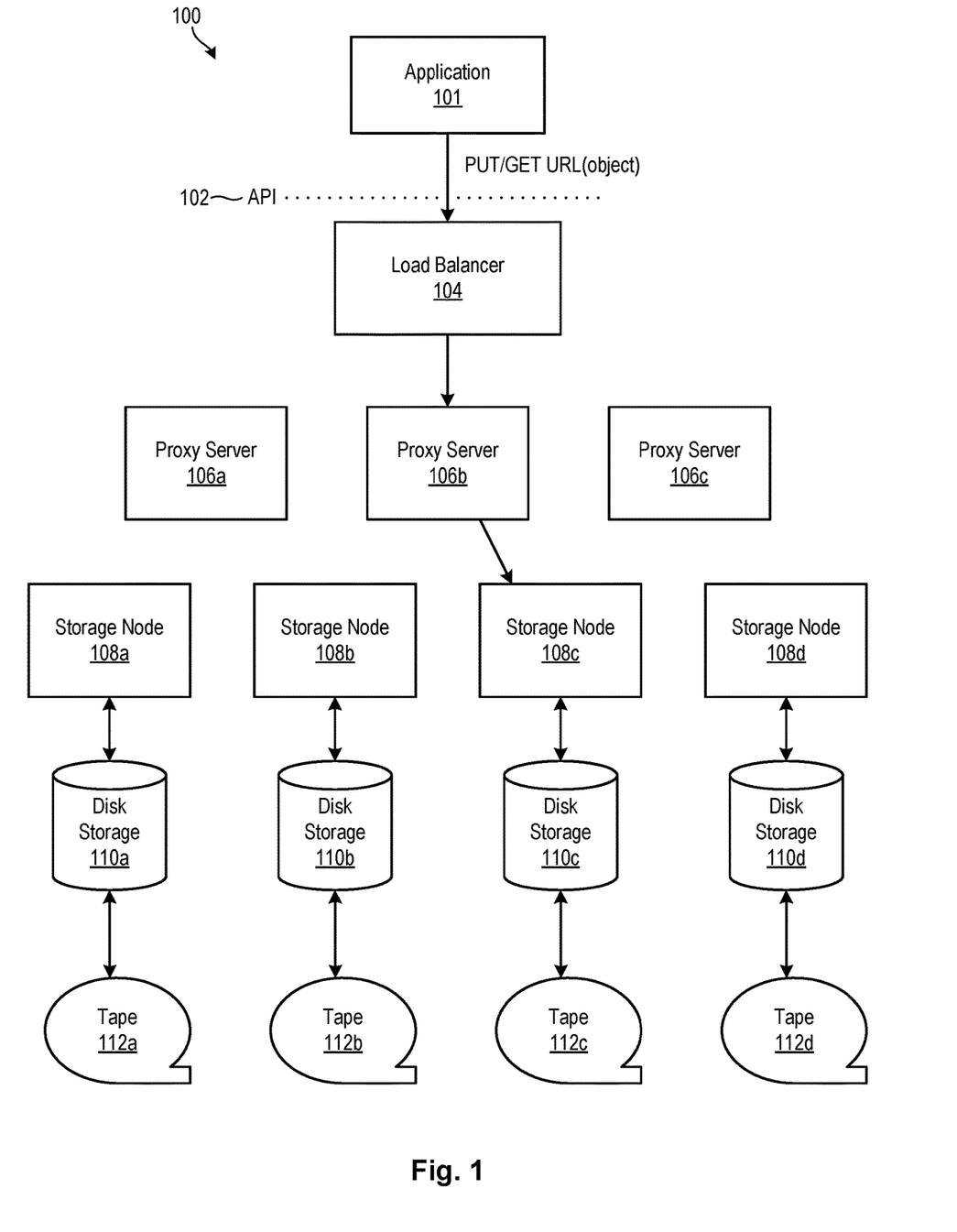
FIG. 1 is a high-level block diagram showing one example of an environment in which systems and methods in accordance with the invention may be implemented.

Referring to FIG. 1, one embodiment of a system 100, such as a cloud-based system 100, for storing and managing objects is illustrated. As shown, an application 101 (which may take various forms) may interface with the system 100 to either store or retrieve objects therefrom. A load balancer 104 may distribute incoming API requests from the application 101 substantially evenly across multiple proxy servers 106*a-c*. The proxy servers 106*a-c* may receive the API requests from the load balancer 104 and send the API requests and associated data, if any, to corresponding storage nodes 108*a-d*. In certain embodiments, data that is stored may be replicated to multiple storage nodes 108*a-d*.

Figure 2:
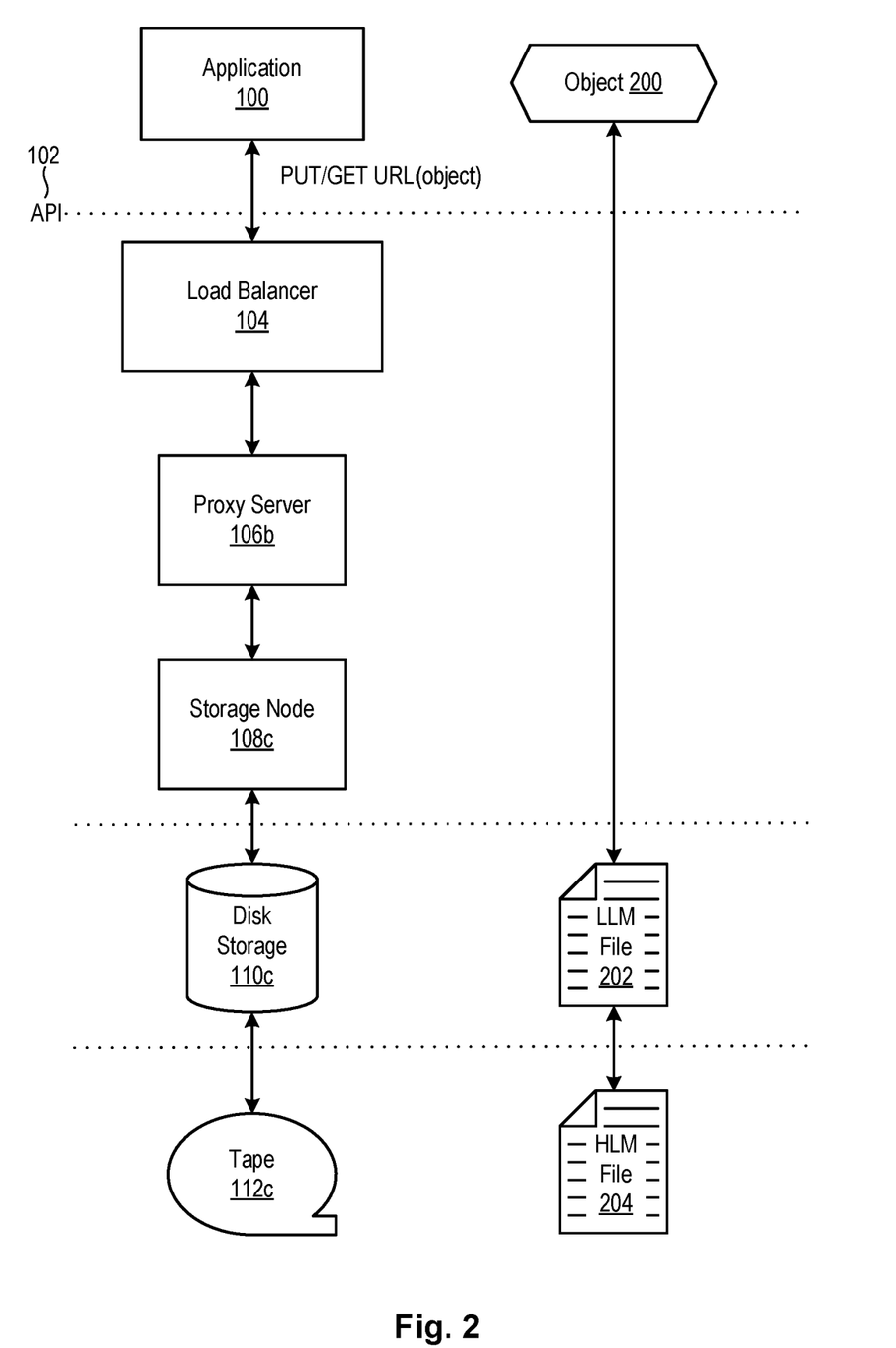
FIG. 2 is a high-level block diagram showing how data may be stored and migrated in the environment of FIG. 1.

As shown in FIG. 1, in certain embodiments, the storage nodes 108*a-d* may initially store data in low-latency storage media, such as disk drives 110*a-d*. This data, when it becomes cold (i.e., accessed infrequently), may be migrated to cheaper high-latency storage media such as tape 112*a-d*. If and when the data is needed, the data may be recalled from tape 112 to the disk drives 110*a-d*, where it may be accessed. As shown in FIG. 2, when an application 101 stores an object 200 in the system 100, the object 200 may be initially stored as a file 202 (hereinafter referred to as an "LLM file 202") on the low-latency storage media 110. This object 200, when it becomes cold, may be stored as a file 204 (hereinafter referred to as an "HLM file 204") on the high-latency storage media 112.

Figure 3:
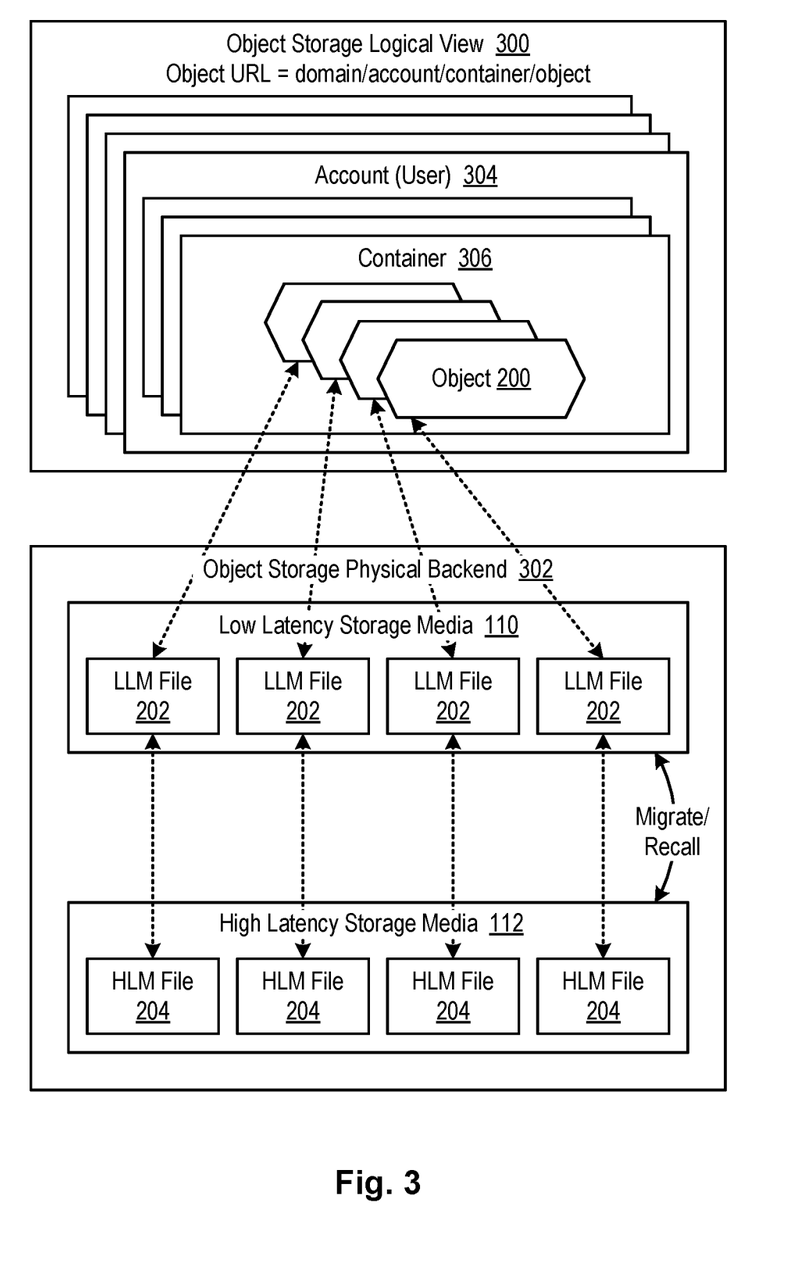
FIG. 3 is a high-level block diagram showing additional detail on how data may be stored and migrated in the environment of FIG. 1.

Referring to FIG. 3, in certain embodiments, each object 200 may be identified using an Internet-wide unique URL (Uniform Resource Locator) organized hierarchically in the form of:

hostname_or_ip/account/container/object

To store or access an object 200, any of multiple proxy nodes 106*a-c* of the system 100 may map the object URL to the object data storage location (i.e., the storage node 108, the storage device 110, and the path on the storage device 110) using a hash-based mathematical function, without a need to keep or retrieve any per-object information other than the object URL. A list of containers 306 for each account 304 may be stored in a per-account database, a list of objects 200 for each container 306 may be stored in a per-container database, and the databases may also be addressed using the hash-based approach discussed above. This enables efficient, distributed, and parallel processing to list object storage content and store or retrieve object data from the storage nodes 108*a-d*.

The object data files 202 and the account and container databases across the storage nodes 108*a-d* are typically stored, at least initially, to low-latency storage media 110 such as disk storage 110. In object storage use cases with large amounts of data and a large proportion of data that is accessed infrequently, the infrequently accessed data may be migrated to cheaper high-latency storage media 112 such as tape 112 or optical disk based file storage.

A conventional object storage solution such as that illustrated in FIG. 3 may migrate data of each LLM file 202 to an HLM file 204, and replace each LLM file 202 with a zero-size file added attribute (also referred to an "inode") on the low-latency storage media 110 that points to the HLM file 204 location (such as the tape name and file name on the tape 112). Before the migrated objects 200 are accessed by a user or application 101, they are typically first recalled from the high-latency storage media 112 to the low-latency storage media 110 in order to avoid data access latencies, timeouts, and inefficient usage of LLM resources.

One drawback of standard object storage is that, for small objects 200, the performance for migrating and recalling the small files 202 between the low-latency storage media 110 and the high-latency storage media 112 is very low. Performance degradation for small files in file systems is well known and understood. This drawback directly impacts the performance of object storage solutions built on top of file storage. Other storage solutions also exhibit inefficiencies when storing and accessing many small units of data, due to per-data unit processing and metadata storing overhead. Use of solid state drives (SSD) instead of hard disk drives (HDD) as low-latency storage media 110 may improve small object 200 performance to a certain extent, but if migration to high-latency storage media 112 is used, zero-size file inodes still occupy expensive SSD space and migration and recall are still slow due to the poor small-file performance. If a linear tape file system (LTFS) is used with the low-latency storage media 110, large numbers of small files also create significant metadata storage overhead on the tape 112.

Thus, systems and methods are needed for archiving small objects 200 in a performance- and cost-efficient manner. Ideally, such systems and methods will improve performance in storage systems where small objects 200 are migrated and recalled between low-latency storage media 110 and high-latency storage media 112. Examples of such systems and methods are illustrated and described in association with FIGS. 4 through 7.

Figure 4:
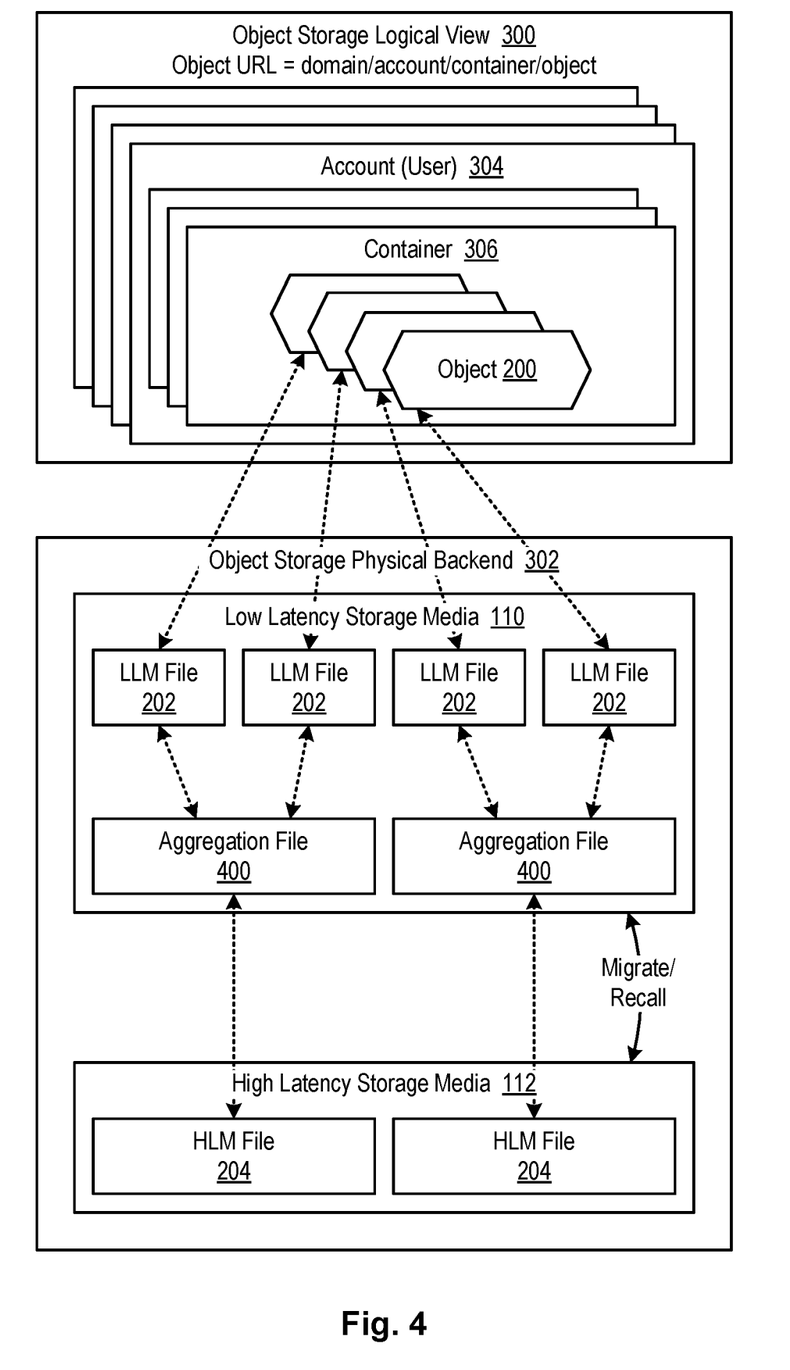
FIG. 4 is a high-level block diagram showing a first technique for storing and migrating small objects.

Referring to FIG. 4, in order to more efficiently archive small objects 200 in a performance- and cost-efficient manner, systems and methods in accordance with the invention may identify objects 200 that are likely to be migrated together. In certain embodiments, these are objects 200 that are in the same container 306 (e.g., folder). Objects 200 are often grouped into containers 306 by project and objects 200 associated with a project are often needed or accessed at or near the same time. Instead of migrating many small LLM files 202 (associated with the objects 200) from the low-latency storage media 110 to the high-latency storage media 112, systems and methods in accordance with the invention may combine the many small LLM files 202 into aggregation files 400 and migrate the aggregation files 400 to the high-latency storage media 112. This may create larger HLM files 204 that require less overhead to manage.

In certain embodiments, as stated above, an aggregation file 400 may include objects 200 from the same container 306. If a container 306 includes very large numbers of objects 200, the objects 200 may be split into multiple aggregation files 400. In other embodiments, objects 200 may be organized into aggregation files 400 based on their time of creation. That is, objects 200 created at or near the same time may be grouped into aggregation files 400. In other embodiments, objects 200 that are likely to be accessed at or near the same time may be grouped into aggregation files 400. This may or may not correspond to the containers 306 in which the objects 200 reside.

As previously mentioned, under normal circumstances, when an LLM file 202 is migrated from low-latency storage media 110 to high-latency storage media 112, an inode, containing metadata for the file 202, may remain on the low-latency storage media 110. This may occupy valuable storage space on the low-latency storage media 110 as well as incur metadata storage overhead. In certain embodiments, when multiple LLM files 202 are combined into a single aggregation file 400, the inodes associated with the LLM files 202 may be deleted from the low-latency storage media 110 and replaced with a single inode associated with the aggregation file 400. This frees space on the low-latency storage media 110 and reduces metadata overhead. When an object 200 is requested that resides in the aggregation file 400, the inode associated with the aggregation file 400 may be referenced to find the aggregation file 400 in the high-latency storage media 112. As will be explained below, metadata stored in the aggregation file 400 may point to the requested object 200 within the aggregation file 400.

In certain embodiments, the LLM file metadata (e.g., inode) that is deleted from the low-latency storage media 110 may be stored in the aggregation file 400 that contains the aggregated LLM files 202. In certain embodiments, each aggregation file 400 contains a map of the locations of objects 200 within the aggregation file 400. This will enable individuals LLM files 202 (i.e., objects 200) to be extracted from the aggregation file 400 as needed. Alternatively, a map of objects 200 within an aggregation file 400 may be stored separately from the aggregation file 400 in any desired format including a database format. This map may, in certain embodiments, be stored with the aggregation file 400 in the high-latency storage media 112 and be migrated/recalled together with the aggregation file 400.

The aggregation file 400 may be created at different times and/or different stages of the archival process. FIG. 4 shows a first embodiment wherein aggregation files 400 are created at the time LLM files 202 are migrated from the low-latency storage media 110 to the high-latency storage media 112. In such embodiments, the same aggregation files 400 may be redivided into individual LLM files 202 when the aggregation files 400 are recalled from the high-latency storage media 112 to the low-latency storage media 110. Alternatively, the aggregation files 400 may be recalled from the high-latency storage media 112 and stored in the low-latency storage media 110 and objects 200 may be extracted from the aggregation files 400 as needed.

Figure 5:
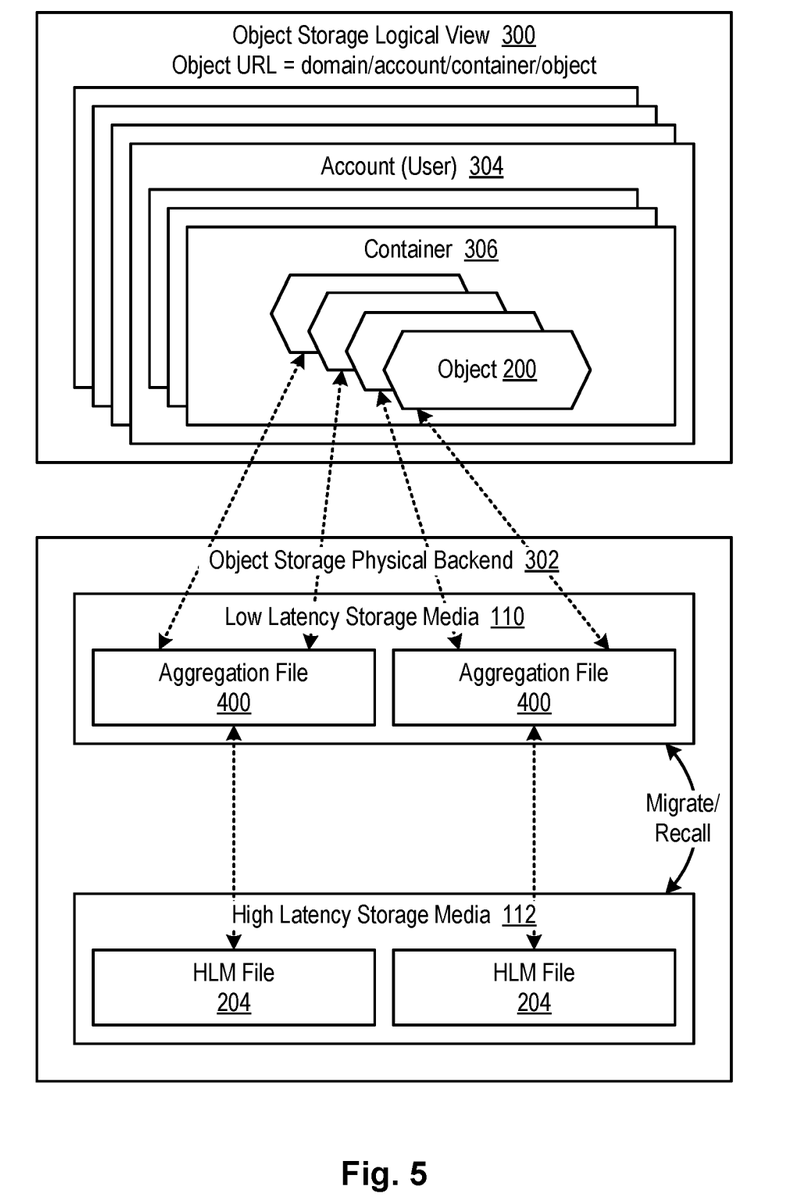
FIG. 5 is a high-level block diagram showing a second technique for storing and migrating small objects.

FIG. 5, by contrast, shows an alternative technique wherein aggregation files 400 are created in the low-latency storage media 110 at the time objects 200 are stored in the low-latency storage media 110. Avoiding creation of individual inodes at object store time and instead creating only an aggregation file inode and reusing the aggregation file 400 to append the data from multiple stored objects 200 may be beneficial for certain typical object storage use cases, such as when many small objects 200 of a container 306 are stored, migrated, and recalled in bulk. The write performance on the low-latency storage media 110 may be improved because time and resources do not need to be used creating many individual inodes for small files, but instead the data may be appended to an already open aggregation file 400. This also reduces any required disk cache size. These improvements are in addition to the migration and recall efficiency improvements that are also achieved in the embodiment of FIG. 4. The solution of FIG. 5 is further detailed in the description associated with FIG. 7. In either embodiment (i.e., the embodiment of FIG. 4 or 5), performance is significantly improved and overhead is reduced when handling large numbers of small objects 200.

To access an object 200 in an aggregation file 400, the same URL that is conventionally used to access the object 200 may be used to access the object 200 in the aggregation file 400. For example, if objects 200 are grouped into an aggregation file 400 based on the container 306 in which they reside, systems and methods in accordance with the invention may compute the location of the aggregation file 400 based on the container path in the URL. The object 200 may then be located in the aggregation file 400 based on the metadata that is stored in the aggregation file 400, or stored external to the aggregation file 400.

Figure 6:
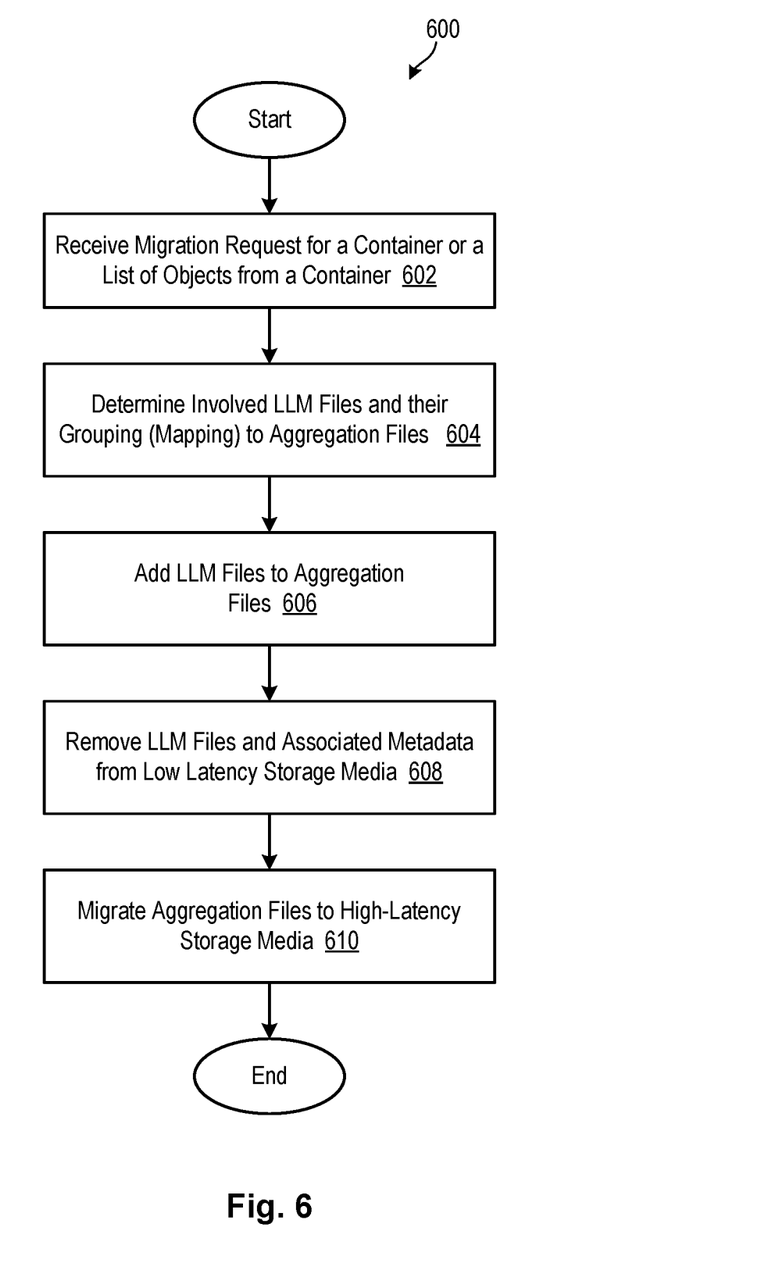
FIG. 6 is a flow diagram showing a method for aggregating small objects at the time of migration.

Referring to FIG. 6, one embodiment of a method 600 for aggregating small objects 200 at the time of migration is illustrated. As shown, the method 600 initially receives 602 a migration request for a container 306 or a list of objects 200 from a container 306. The method 600 then determines 604 the data files (i.e., the LLM files 202) and their grouping (i.e., mapping) to aggregation files 400. The method 600 then adds 606 the LLM files 202 to their corresponding aggregation files 400. This may include adding metadata associated with the LLM files 202 to the aggregation files 400. The method 600 then removes 608 the LLM files 202 and associated metadata (e.g., inodes) from the low-latency storage media 110. The method 600 then migrates 610 the aggregation files 400 to the high-latency storage media 112 using, for example, standard file migration software.

Figure 7:
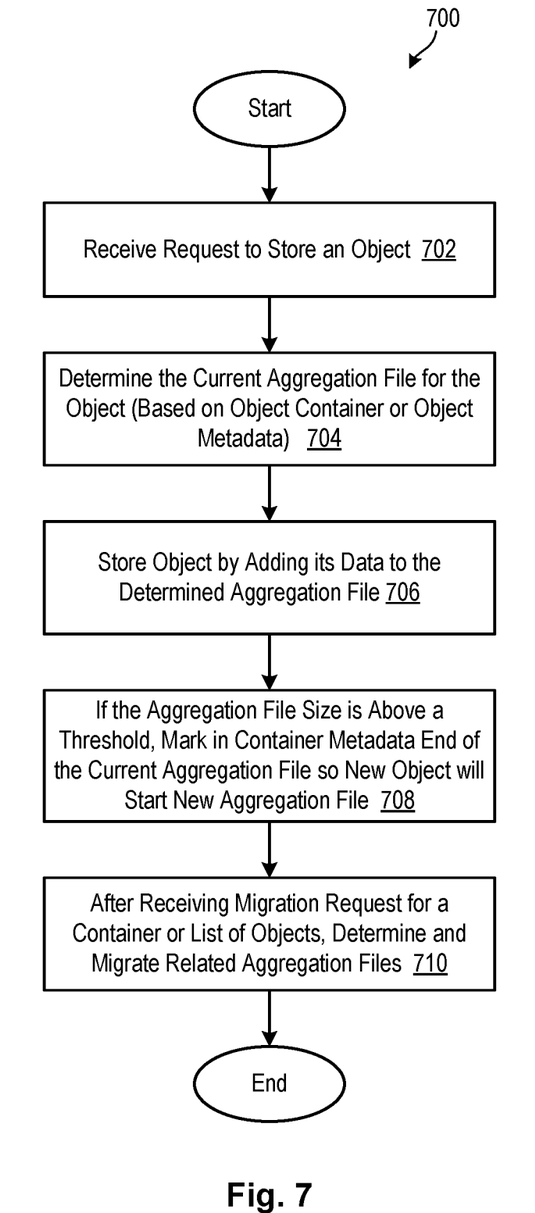
FIG. 7 is a flow diagram showing a method for aggregating small objects at the time of initial storage.

Referring to FIG. 7, one embodiment of a method 700 for aggregating small objects 200 at the time of initial storage is illustrated. As shown, the method 700 receives 702 a request to store an object 200. The method 700 then determines 704 the current aggregation file 400 for the object 200. In certain embodiments, this may be based on the object's container 306 or metadata associated with the object 200. The method 700 then stores 706 the object 200 by adding 706 the object 200 to the determined aggregation file 400. This may include adding metadata to the aggregation file 400 that identifies the object 200 and its position within the aggregation file 400. In certain embodiments, if the size of the aggregation file 400 is above a selected threshold, the method 700 marks, in metadata of the aggregation file 400 or a container 306 associated with the aggregation file 400, that the end of the aggregation file 400 has been reached. This will start a new aggregation file 400 for the next received object 200. After receiving a migration request for a container 306 or a list of objects 200, the method 700 may determine 710 and migrate 710 the corresponding aggregation files 400.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for archiving small objects in a performance- and cost-efficient manner, the method comprising:
   receiving a plurality of files, each file representing an object;
   combining selected files of the plurality of files into an aggregation file;
   storing the aggregation file on low-latency storage media;
   representing the aggregation file with a single inode stored on the low-latency storage media;
   migrating the aggregation file to high-latency storage media while leaving the single inode representing the aggregation file on the low-latency storage media;
   recalling the aggregation file from the high-latency storage media; and
   upon recalling the aggregation file from the high-latency storage media, replacing, on the low-latency storage media, the single inode with individual inodes associated with the selected files.

2. The method of claim 1, wherein the selected files are associated with objects in a container.

3. The method of claim 1, wherein the selected files are at least one of: files that were created at or near the same time; and files that are likely to be accessed at or near the same time.

4. The method of claim 1, further comprising storing, in at least one of the aggregation file and a location external to the aggregation file, a mapping indicating positions of the selected files within the aggregation file.

5. The method of claim 1, further comprising, upon recalling the aggregation file from the high-latency storage media, splitting the aggregation file into the selected files and storing the selected files on the low-latency storage media.

6. A computer program product for archiving small objects in a performance- and cost-efficient manner, the computer program product comprising a computer-readable medium having computer-usable program code embodied therein, the computer-usable program code configured to perform the following when executed by at least one processor:
   receive a plurality of files, each file representing an object;
   combine selected files of the plurality of files into an aggregation file;
   store the aggregation file on low-latency storage media;
   represent the aggregation file with a single inode stored on the low-latency storage media;
   migrate the aggregation file to high-latency storage media while leaving the single inode representing the aggregation file on the low-latency storage media;
   recall the aggregation file from the high-latency storage media; and
   upon recalling the aggregation file from the high-latency storage media, replace, on the low-latency storage media, the single inode with individual inodes associated with the selected files.

7. The computer program product of claim 6, wherein the selected files are associated with objects in a container.

8. The computer program product of claim 6, wherein the selected files are at least one of: files that were created at or near the same time; and files that are likely to be accessed at or near the same time.

9. The computer program product of claim 6, wherein the computer-usable program code is further configured to store, in at least one of the aggregation file and a location external to the aggregation file, a mapping indicating positions of the selected files within the aggregation file.

10. The computer program product of claim 6, wherein the computer-usable program code is further configured to, upon recalling the aggregation file from the high-latency storage media, split the aggregation file into the selected files and store the selected files on the low-latency storage media.

11. A system for archiving small objects in a performance- and cost-efficient manner, the system comprising:
    at least one processor;
    at least one memory device coupled to the at least one processor and storing instructions for execution on the at least one processor, the instructions causing the at least one processor to:
      receive a plurality of files, each file representing an object;
      combine selected files of the plurality of files into an aggregation file;
      store the aggregation file on low-latency storage media;
      represent the aggregation file with a single inode stored on the low-latency storage media;
      migrate the aggregation file to high-latency storage media while leaving the single inode representing the aggregation file on the low-latency storage media;
      recall the aggregation file from the high-latency storage media; and
      upon recalling the aggregation file from the high-latency storage media, replace, on the low-latency storage media, the single inode with individual inodes associated with the selected files.

12. The system of claim 11, wherein the selected files are associated with objects in a container.

13. The system of claim 11, wherein the instructions further cause the at least one processor to store, in at least one of the aggregation file and a location external to the aggregation file, a mapping indicating positions of the selected files within the aggregation file.

14. The system of claim 11, wherein the instructions further cause the at least one processor to, upon recalling the aggregation file from the high-latency storage media, split the aggregation file into the selected files and store the selected files on the low-latency storage media.

* * * * *